No. 703,895. Patented July 1, 1902.
A. F. CLARK.
SEPARATOR PLATE FOR SECONDARY BATTERIES.
(Application filed Oct. 18, 1900.)
(No Model.)
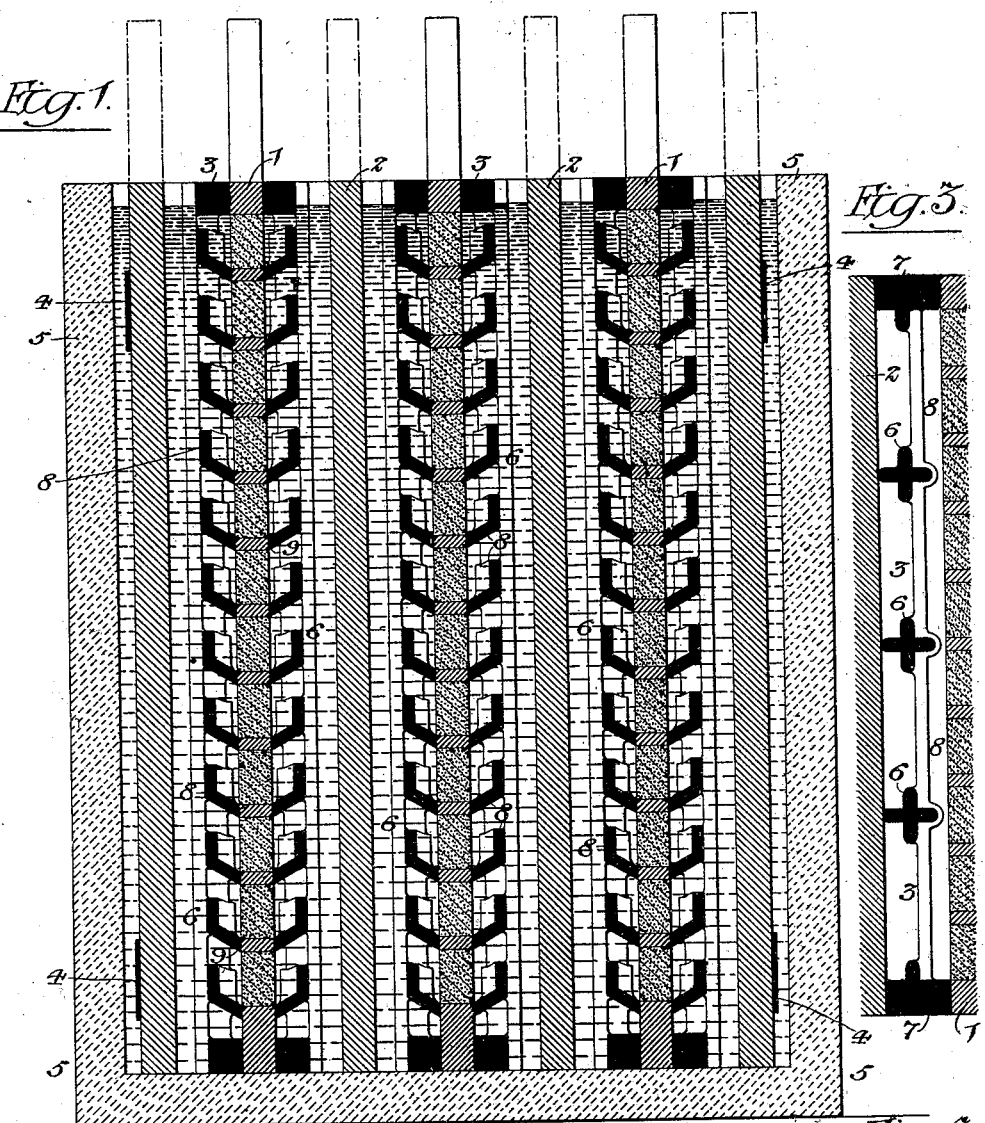
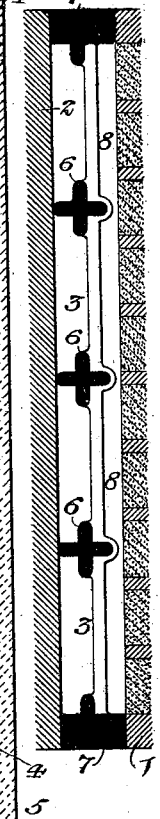
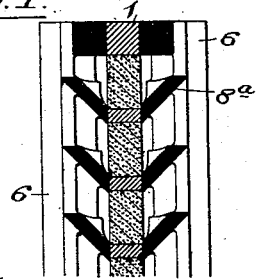
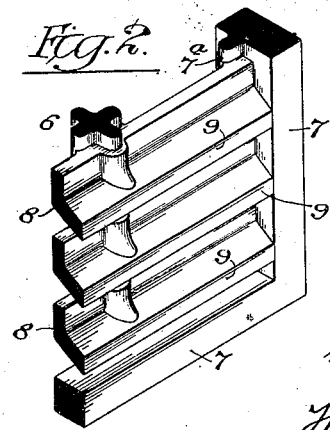
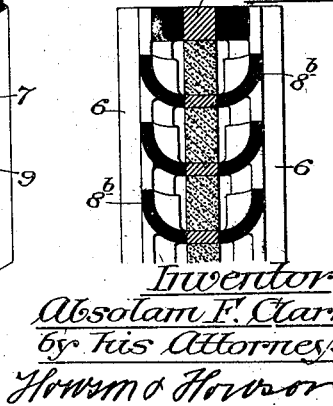
Witnesses:-
Inventor:-
Absolam F. Clark.
by his Attorneys.
Howson & Howson
THE NORRIS PETERS CO., PHOTO-LITHO., WASHINGTON, D. C.

UNITED STATES PATENT OFFICE.

ABSOLAM F. CLARK, OF PHILADELPHIA, PENNSYLVANIA, ASSIGNOR TO
J. HORACE HARDING, OF PHILADELPHIA, PENNSYLVANIA.

SEPARATOR-PLATE FOR SECONDARY BATTERIES.

SPECIFICATION forming part of Letters Patent No. 703,895, dated July 1, 1902.

Application filed October 18, 1900. Serial No. 33,470. (No model.)

*To all whom it may concern:*

Be it known that I, ABSOLAM F. CLARK, a citizen of the United States, residing in Philadelphia, Pennsylvania, have invented certain Improvements in Separator-Plates for Secondary Batteries, of which the following is a specification.

My invention relates to secondary batteries; and it consists of an improved form of separator-plate devised especially for the purpose of supporting the active material when it breaks away from the grids, so that said active material will not fall to the bottom of the battery-cell and short-circuit the same.

My invention is fully illustrated in the accompanying drawings, in which—

Figure 1 is a sectional view of a battery-cell provided with the improved form of separator-plate devised by me. Fig. 2 is perspective view of a portion of said plate. Fig. 3 is a sectional plan view of the separator-plate, and Figs. 4 and 5 are views showing modified forms of the same.

The object of my invention is to provide a separator-plate that will support at all times the active material carried by the positive electrodes.

In the drawings herewith, 1 represents the positive electrodes, 2 the negative electrodes, and 3 the improved separator-plate, forming the subject of my invention. I have shown these parts combined to form an ordinary secondary battery, the elements and separator-plates being confined together by ordinary rubber bands 4 and the whole structure mounted in a suitable battery-cell 5.

The positive plates 1 which I prefer to use with my improved separator-plates are made in the form of grids and have active material pressed into the interstices formed by the cross-bars of the grid, and these cross-bars are disposed at regular intervals throughout said grid. The negative plates 2 are ordinary lead plates of usual construction. The separator-plates, which may be composed of rubber, celluloid, or any other material not affected by the electrolyte, are made up as follows: 6 represents a series of rods cruciform in cross-section, and 7 is the outer frame of said separating-plate, to which the rods 6 are attached top and bottom. Extending from side to side of said frame are a series of bars 8, having an angular cross-section, substantially that shown in Fig. 1, and these bars are secured to the vertical rods 6 and to the frame 7 by pressing these parts together in a heated die and afterward vulcanizing the entire structure. The lower portion 9 of the angular cross-bars 8 are arranged to meet the cross-bars forming the grid of the positive electrodes, and when the elements of the battery are assembled as shown in Fig. 1 the cross-bars 8 form pockets or supporting-sleeves adjacent to the masses of active material.

As is well known, in all forms of secondary batteries the charging and recharging of the batteries tends to cause the active material to swell and become porous and in time to disintegrate. When disintegration takes place, the active material usually falls to the bottom of the battery and short-circuits the same. By the use of the separating-plates which I have devised, however, pockets or shelves are provided which are adapted to receive this active material whenever the same tends to disintegrate and break down. I am therefore able to increase the life of secondary batteries very materially, as the active material is maintained in its proper position with relation to the positive electrode until complete disintegration of said electrode takes place.

In Fig. 4 I have shown a modified form of plate in which the cross-bars $8^a$ are disposed at an angle between the grid of the electrode and the supporting-rods of the separating-plate, and in Fig. 5 the cross-bars $8^b$ are curved. In each instance, however, a supporting pocket or shelf for the active material is formed by the cross-bar.

My improved separating-plate is made in the following manner: I provide a frame 7, comprising top and bottom and side pieces of the desired size, and at equidistant points I arrange the cruciform rods 6 in a vertical position. The angular pieces 8 are then laid across the rods 6 and upon ribs $7^a$, carried by the side pieces of the frame 7. The structure thus arranged is then disposed upon a platen having a surface adapted to receive the same. After this a suitable die having its face shaped to press the plate into proper form is brought down upon the structure. This platen and die being then heated the separator-plate is pressed into the required shape and is subsequently vulcanized in the usual manner.

Having thus described my invention, I claim and desire to secure by Letters Patent—

1. As a new article of manufacture, a separator for use in connection with secondary-battery grid-plates, said separator comprising a frame, a series of cross-bars secured to said frame and a series of supporting-bars at the back of and embedded in the cross-bars, each of said cross-bars forming, with the grates of the grid, a series of pockets, substantially as described.

2. As a new article of manufacture, a separator for use in connection with secondary-battery grid-plates, said separator comprising a frame, a series of cross-bars secured to said frame and spaced apart to permit a circulation of the electrolyte, and a series of supporting-bars at the back of and embedded in the cross-bars, said cross-bars adapted to form with the grates of the grid, pockets, substantially as described.

3. As a new article of manufacture, a separator-plate for use in connection with the grid-electrodes of secondary batteries, said separator-plate comprising a series of vertical rods, and a series of cross-bars in which portions of said vertical rods are embedded, said cross-bars being spaced apart to permit the circulation of the electrolyte and having a portion contacting with the grates of the grid whereby supporting-shelves are disposed adjacent thereto, substantially as described.

4. As a new article of manufacture, a separator for use in connection with secondary-battery grid-electrodes, said separator comprising a frame, a series of vertical rods secured to said frame, and a series of cross-bars mounted on said rods, the latter being embedded in the cross-bars which are also secured to the frame, said bars being spaced apart to permit a circulation of the electrolyte and arranged to form a series of shelves or pockets adapted to coact with the grates of the grid with which they are used, substantially as described.

5. The combination in a storage-battery cell, of the negative electrodes, positive electrodes in the form of grids having active material pressed into the interstices thereof, and separating-plates arranged between said electrodes, said plates carrying a series of shelves or pockets the edges of which are in contact with the grates of the grid, said shelves or pockets serving to receive any portion of the active material that may break away from the grid, substantially as described.

In testimony whereof I have signed my name to this specification in the presence of two subscribing witnesses.

ABSOLAM F. CLARK.

Witnesses:
MURRAY C. BOYER,
JOS. H. KLEIN.